B. E. HERRIN.
EXTENSION CAR STEP.
APPLICATION FILED MAY 6, 1913.
1,109,224.
Patented Sept. 1, 1914.
3 SHEETS—SHEET 2.
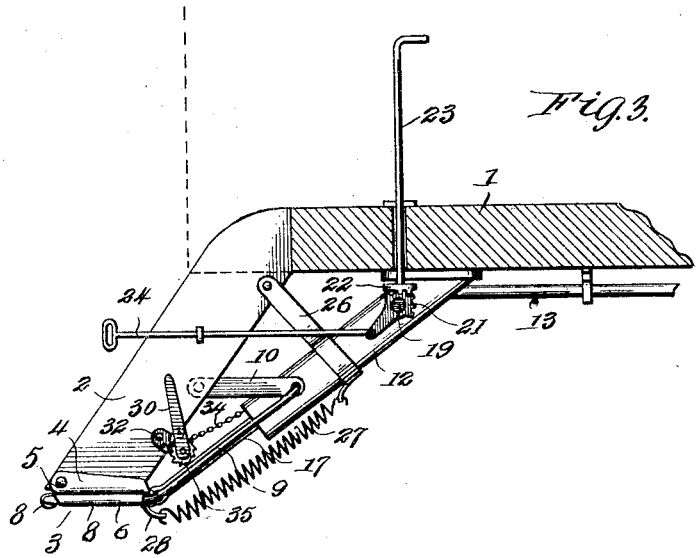
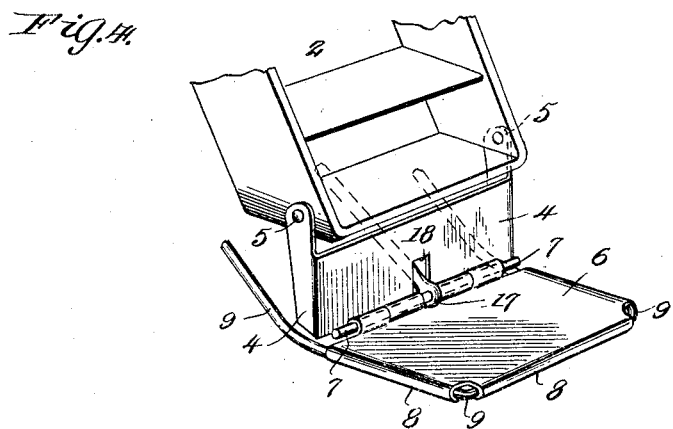
WITNESSES:
G. M. Spring
W. E. Valk Jr.
INVENTOR
Berwin E. Herrin
BY
Richard Owen
his ATTORNEY

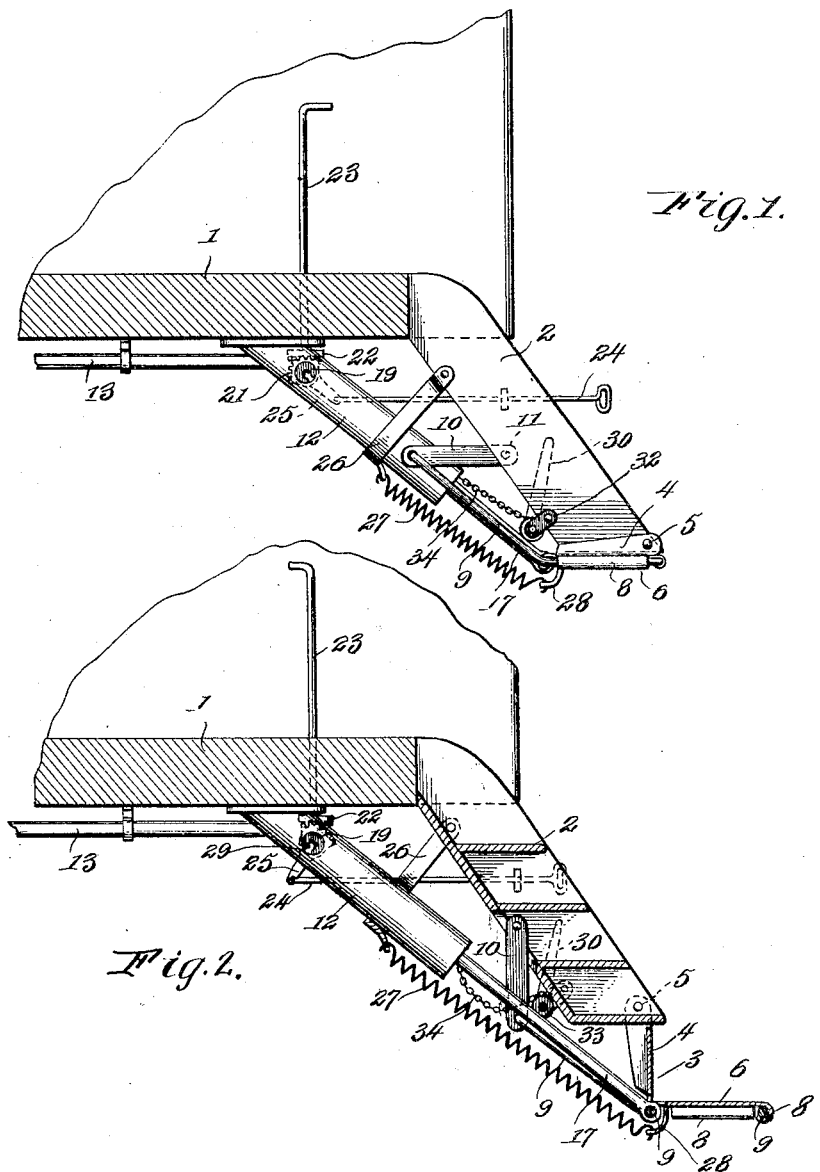

B. E. HERRIN.
EXTENSION CAR STEP.
APPLICATION FILED MAY 6, 1913.

1,109,224.

Patented Sept. 1, 1914.
3 SHEETS—SHEET 3.

WITNESSES:
G. M. Spring.
W. E. Valk Jr.

INVENTOR
Bewin E. Herrin,
BY
Richard Herrin
his ATTORNEY

UNITED STATES PATENT OFFICE.

BERVIN E. HERRIN, OF AHLOSO, OKLAHOMA.

EXTENSION CAR-STEP.

1,109,224.

Specification of Letters Patent.

Patented Sept. 1, 1914.

Application filed May 6, 1913. Serial No. 765,849.

*To all whom it may concern:*

Be it known that I, BERVIN E. HERRIN, citizen of the United States, residing at Ahloso, in the county of Pontotoc and State of Oklahoma, have invented certain new and useful Improvements in Extension Car-Steps, of which the following is a specification.

This invention relates to an improved extension car step and more particularly to that type wherein pneumatic pressure is utilized for extending or operating the said step, the air pressure being supplied by the air brake line now commonly employed in connection with railway passenger coaches.

The primary object of the invention contemplates the provision of a collapsible extension car step adapted to be operated either from a car platform or the ground by means of a suitable valve arranged within the air line of the pneumatic means provided for operating or extending the step.

A further object of the invention contemplates the provision of a compressed air cylinder within which the operating valve is arranged, the piston of the cylinder being connected to the extension step for operating or extending the same according to the air pressure directed upon the piston.

A still further object of the invention resides in the provision of suitable pawl and ratchet mechanism arranged exteriorly of the permanent car steps whereby operation of the extension step may be accomplished without utilizing the pneumatic means provided therefor.

The invention still further resides in the provision of a novel and peculiar collapsible extension step wherein the step proper or tread is pivotally supported by the riser and is adapted to fold thereupon when not in extended position, the movement or operation of the said tread being controlled by the movement of the cylinder piston.

The above and additional objects are accomplished by such means as are illustrated in their preferred embodiment in the accompanying drawings described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 5:
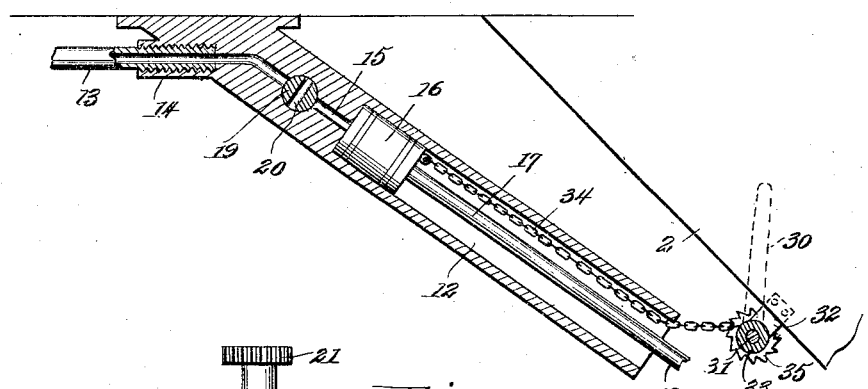
Figure 6:
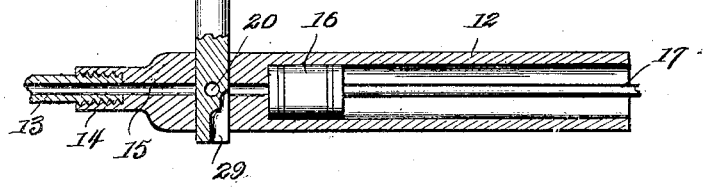
Figure 7:
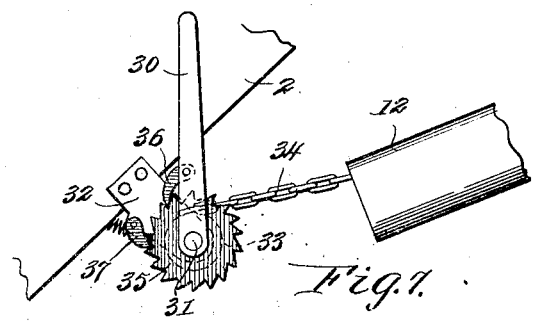

Figure 1 is a detail side elevation of an extension car step constructed in accordance with my invention, the car platform being shown in section; Fig. 2 is a similar view showing the car step extended. Fig. 3 is a view similar to Fig. 1 looking at the reverse side of the step; Fig. 4 is a detail perspective view of the extension step; Fig. 5 is an enlarged longitudinal sectional view of the compressed air cylinder; Fig. 6 is a similar view, the section being taken in a transverse direction to that of Fig. 5; and Fig. 7 is a detail elevation of the pawl and ratchet mechanism.

Referring now to the drawings, wherein is illustrated the preferred form of my invention the numeral 1 designates the platform of a railway passenger coach having the usual permanent car steps 2 depending therefrom.

The extension step designated in its entirety by the numeral 3, comprises a riser 4 pivotally connected as at 5 near the lower forward extremity of the permanent car steps 2, and a tread 6 hingedly or pivotally connected to the riser 4 through the medium of a pin 7, the latter extending throughout the length of the tread for effecting a strong and reliable support therefor. The edges of the step 6 are provided with curved extensions or flanges 8 adapted to encircle a suitable supporting rod 9 extending therethrough, the extremities of the said rod being pivotally connected to links 10, the said links being in turn pivotally connected as at 11 to the sides of the permanent car steps 2. By this arrangement it will be seen that the tread 6 is supported in the desired manner and upon the same plane as the permanent steps 2 at all times as the supporting rod 9 by reason of its pivotal connection to the links 10 is so formed as to extend approximately parallel with the car steps 2.

Having described the construction of the car step, and the manner in which the same is supported, the means employed for operating the said step will now be described in detail.

A compressed air cylinder 12 is secured to the underface of the car platform 1 and is disposed at an angle thereto, the upper extremity of the cylinder having an air pipe 13 threaded into an extension 14 of the cylinder. An air passage-way 15 is provided in the upper portion of the air cylinder 12, the said passage way 15 leading from the air inlet pipe 13 to the interior of the cylinder proper for admitting air under pressure thereinto. A piston 16 is disposed within the cylinder 12, the said piston having a piston rod 17 extending therefrom, its opposite end being connected to the hinge-rod 7 of the extension step 3, the said piston rod extending through an opening 18 formed within the riser 4 of the extension step. The air supply pipe 13 being connected to the air brake line of the railway coach upon which the device is applied, it will be seen that air under pressure may be admitted to the cylinder 12 where it is directed against the inner face of the piston 16 causing the said piston to slide within the cylinder thereby extending the step 3 to which the piston rod is loosely connected, the link 10, and the engagement between the riser 4 and the permanent step 2 limiting the forward or outward movement of the said piston rod and extension step.

The means employed for controlling the air supply of the compressed air cylinder comprises a rotary valve 19 having a passage way or duct 20 formed therein. The said duct 20 normally extends in a transverse direction to the passage way 15 of the cylinder so as to cut off the air supply thereto, but the rotation of the valve, until the duct 20 registers with the passage way 15, will effect a continuous air passage from the supply pipe 13 to the interior of the cylinder 12 thereby permitting the piston 16 to be operated or actuated as above described. The said valve 19 extends upon the exterior of the cylinder and is supplied with a segmental rack 21 into which a pinion 22 meshes, the said pinion being arranged upon the extremity of a vertically extending rod 23 supported by the platform 1 and projecting upwardly therefrom at a convenient point. By turning the rod 23, similar movement is imparted to the pinion 22 which in turn rotates the valve 19 and causes the air supply of the air brake line to enter the cylinder by reason of the duct 20 formed within the said valve. A second valve operating rod 24 is slidably mounted upon the permanent car step side 2 and is connected at its inner extremity to a link 25 formed upon the extended portion of the said valve, this arrangement permitting the said valve to be operated from the ground as well as the car platform.

The manner in which the car step 3 is extended having been described, it now remains to set forth the means provided for turning the said step to its normal position.

A bracket 26 depends from the permanent car step sides 2, the said bracket being arranged over the cylinder 12 for effecting a support therefor and for further effecting a stationary support to which one end of a spring 27 is secured, the opposite end of the said spring being secured to a tongue 28 formed integrally with the tread 6 of the extension step. An outlet opening 29 is formed within the rotary valve 21 at the lower end thereof, the said opening adapted to normally register with the passage way 15 of the cylinder thus permitting the compressed air contained therein to be exhausted, when the said valve is turned or rotated until the said opening registers with the passage way as is clearly shown in Fig. 6 of the drawings. After having operated the valve as just described, it will be seen that the tension of the spring 27 will cause the piston rod 17 and the piston 16 to move upwardly and into the cylinder 12 forcing the compressed air out through the opening 29 of the said valve, which movement of the piston rod will cause the extension step 3 to collapse or fold and will bring the tread 6 into engagement with the riser 4 of the said step, the latter being swung upon its pivot point 5 until completely folded beneath the lower portion of the permanent steps 2.

When it is desired that the device should be used in conection with railway cars wherein no air brake line is employed, a hand operated lever 30 is provided the said lever being pivotally connected to a drum shaft 31 supported by means of a bracket 32 carried by the permanent steps 2 of the coach. A drum 33 is arranged upon the drum shaft 21 and is rotatable therewith according to the movement of the hand lever 30, the said drum having a chain 34 secured thereto, the opposite end of the chain being connected to the piston 16 and extending into the cylinder 12 from its lower open end. The operation of the hand lever 30 will cause the said drum to rotate thereby winding the chain 30 thereupon, this action causing the piston 16 to be moved within the cylinder similar to the movement imparted thereto by the means above describ d. One end of the drum having a ratchet wheel 35 secured thereto, and the lever 30 having a pawl 36 pivoted thereto adapted to engage the said ratchet, it will be seen that sufficient rotation of the drum is allowed for winding the chain 34 thereupon, the spring pressed pivoted pawl 37 engaging the ratchet wheel 35 and preventing the said wheel and the drum for unwinding during the operation of the hand lever 30. The car step being extended by the operation of the lever 30, the disengagement of the pawl 37 and the ratchet wheel 35 will allow the drum to unwind thus permitting the spring 27 to collapse or fold the extension step 3 and return the piston to its normal position illustrated in Figs. 5 and 6 of the drawings.

It will be seen from the above, taken in connection with the accompanying drawings that three means have been provided for operating the extension step; that the rotary valve is actuated from either the car platform or the ground; and that in the absence of pneumatic pressure, the car step may be extended by the manipulation of the hand lever 30.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In combination with an extensible car step, a compressed air cylinder, a piston operable within said cylinder and having connection with said step, a valve for controlling the air supply thereto, means for actuating said valve from the car platform, means for actuating said valve from the station platform, and means having connection with said piston for actuating said step independent of the pneumatic means, as and for the purpose set forth.

2. In combination with an extensible car step, pneumatic means including a compressed air cylinder, a piston operable within said cylinder, said piston having connection with the said step, a valve for controlling the air supply thereto, a segmental rack secured to said valve adapted to be actuated from the car platform, a link connected to said valve adapted to be actuated from the station platform, and spring means for returning said step to its normal folded position when the air pressure within the cylinder is relieved, as and for the purpose set forth.

3. In combination with an extensible car step, an operating rod connected thereto, movable support means therefor, and pawl and ratchet mechanism connected to said operating rod for actuating said step, as and for the purpose set forth.

4. In combination with an extensible car step, a compressed air cylinder, a piston operable within said cylinder and having connection with said step, a rotary valve operable adjacent said cylinder for controlling the air supplied thereto, means for actuating said valve from the car platform, means for actuating said valve from the station platform, and means including suitable pawl and ratchet mechanism having connection with said piston for actuating the same independent of the pneumatic means, as and for the purpose set forth.

5. In combination with an extensible car step, an operating rod therefor, support means for the said step, means for normally maintaining said step in folded position, and means including suitable pawl and ratchet mechanism having connection with said operating rod for actuating the same to extend the step, as and for the purpose set forth.

6. An extension car step including a collapsible step arranged at the base of the permanent car step, a compressed air cylinder arranged adjacent the said collapsible step, a piston operated within the said cylinder and connected to the said collapsible step for extending the latter by the air pressure directed upon the said piston, a rotary valve disposed adjacent the said cylinder for controlling the air pressure thereof, a segmental rack carried by the said rotary valve upon the exterior of the said cylinder, and a hand lever having a pinion mounted thereupon adapted to engage with the segmental rack for rotating the valve from the car platform, as and for the purpose set forth.

7. An extension car step including a collapsible step arranged at the base of the permanent car step, a compressed air cylinder arranged adjacent the said collapsible step, a piston operated within the said cylinder by the compressed air directed thereupon, the said piston being connected to the said collapsible step for extending the latter according to the movement of the said piston, a rotary valve disposed adjacent the said cylinder for controlling the air pressure thereof, a segmental rack carried by the said rotary valve and disposed upon the exterior of the cylinder, the operating rod having a pinion secured upon one end thereof meshing into the said segmental rack for operating the valve from the car platform, and means including a spring one end of which is secured to the said extension step for returning the latter into folded position, as and for the purpose set forth.

8. In combination with a collapsible extension car step, a compressed air cylinder arranged adjacent thereto, a rotary valve disposed adjacent the said cylinder for controlling the air pressure thereof, a piston operated within the said cylinder and connected to the said step for extending the latter by the air pressure directed upon the said piston, means for operating the said valve from the car platform and means including a hand lever connected to the said valve for operating the same independently of the platform operating means.

9. In combination with a collapsible extension car step, a compressed air cylinder arranged adjacent thereto, a rotary valve disposed adjacent the said cylinder for controlling the air pressure thereof, a piston operated within the said cylinder and connected to the said collapsible step for extending the latter by the air pressure directed upon the said piston, a spring secured to the said extension step for returning the latter to folded position, means for operating the said rotary valve from the car platform, means for operating the said valve independent of the platform operating means, and means for extending the said step independent of the operation of the said rotary valve.

10. In combination with a collapsible extension car step, a compressed air cylinder arranged adjacent thereto, a piston operated adjacent the said cylinder, the said piston being connected to the said collapsible step for extending the latter according to the movement of the said piston, a rotary valve disposed adjacent the said cylinder for controlling the air pressure thereof, means for operating the said valve independent of the car platform operating means, means for operating the said valve from the car platform, and means including pawl and ratchet mechanism for extending the said collapsible step independent of the operation of the said rotary valve.

11. In combination with a collapsible extension car step, a cylinder arranged adjacent thereto, a piston operated within the said cylinder and connected to the said collapsible step for extending the latter according to the movement of the said piston, pneumatic means for operating the said piston, a drum disposed adjacent the said cylinder, means connecting the said drum to the said piston, a lever connected to the said drum for rotating the same, pawl and ratchet mechanism operated by the said lever for controlling the rotation of the said drum, the rotation of the said drum adapted to move the said piston for extending the said collapsible step and means including a spring connected to the said step for returning the same into folded position when the said pawl and ratchet mechanism is released.

In testimony whereof I affix my signature in presence of two witnesses.

BERVIN E. HERRIN.

Witnesses:
F. F. FALTER,
F. N. HERRIN.